United States Patent [19]
Goldenberg

[11] Patent Number: 5,075,106
[45] Date of Patent: Dec. 24, 1991

[54] VINYLIC MACROMERS CONTAINING PERFLUOROPOLYALKYLETHER AND POLYALKYLETHER SEGMENTS, POLYMERS AND OPHTHALMIC DEVICES MADE THEREFROM

[75] Inventor: Merrill Goldenberg, Teaneck, N.J.

[73] Assignee: Ciba-Geigy Corporation, Ardsley, N.Y.

[21] Appl. No.: 622,890

[22] Filed: Dec. 5, 1990

Related U.S. Application Data

[62] Division of Ser. No. 500,435, Mar. 28, 1990, Pat. No. 4,994,504, which is a division of Ser. No. 296,170, Jan. 11, 1989, Pat. No. 4,933,408.

[51] Int. Cl.$^5$ .................... C08F 22/02; C08F 299/06; A61F 2/14; G02C 7/04
[52] U.S. Cl. .................... 526/247; 523/106; 525/91; 525/510; 525/922; 525/937; 525/912; 351/160 H; 424/429

[58] Field of Search ................ 523/106; 525/937, 912, 525/922; 526/247

[56] References Cited

U.S. PATENT DOCUMENTS

| | | | |
|---|---|---|---|
| 3,639,524 | 2/1972 | Selderman | 260/885 |
| 3,841,985 | 10/1974 | O'Driscoll et al. | 204/159.16 |
| 3,929,741 | 12/1975 | Laskey | 260/79.3 M |
| 3,985,697 | 10/1976 | Urbach | 264/1 |
| 4,440,918 | 4/1984 | Rice et al. | 526/246 |
| 4,818,801 | 4/1989 | Rice et al. | 523/106 |
| 4,820,588 | 4/1989 | Brinduse et al. | 428/422 |
| 4,933,408 | 6/1990 | Goldenberg | 526/247 |
| 4,994,504 | 2/1991 | Goldenberg | 523/106 |

Primary Examiner—Thurman K. Page
Assistant Examiner—E. Webman

[57] ABSTRACT

The instant invention relates to vinylic macromers containing perfluoropolyalkylether and polyalklether segments, polymers and ophthalmic devices such as intraocular implants and contact lenses and particularly soft hydrogel contact lenses made therefrom.

4 Claims, No Drawings

VINYLIC MACROMERS CONTAINING PERFLUOROPOLYALKYLETHER AND POLYALKYLETHER SEGMENTS, POLYMERS AND OPHTHALMIC DEVICES MADE THEREFROM

This is a divisional of application Ser. No. 500,435 now U.S. Pat. No. 4,994,504 filed on Nov. 28, 1990, which is a divisional of Ser. No. 296,170 filed on Jan. 11, 1989 now U.S. Pat. No. 4,933,408 issued on June 12, 1990.

BACKGROUND OF THE INVENTION

The instant invention relates to vinylic macromers containing perfluoropolyalkylether and polyalkylether segments, polymers and ophthalmic devices, such as intraocular implants and contact lenses and particularly soft hydrogel contact lenses made therefrom. These devices possess an advantageous blend of desirable properties including (a) high oxygen permeability, (b) excellent wettability, (c) high mechanical strength, (d) flexibility, (e) optical clarity, (f) biocompatibility, and (g) are capable of being sterilized in boiling water. The perfluoropolyalkylether segments provide in large part the high oxygen permeability, the polyalkylether segments provide the wettability and the unique polymer structure provides the desired mechanical properties.

In general, most existing hydrogel soft contact lens materials are based on HEMA, also known as hydroxyethyl methacrylate or as ethylene glycol monomethacrylate, with one or more optional comonomers as described in U.S. Pat. Nos. 2,976,576, 3,841,985 and 3,985,697. Other hydrogels based on N-vinylpyrrolidone copolymers and acrylamide copolymers are disclosed in U.S. Pat. Nos. 3,639,524 and 3,929,741. These prior art hydrogel polymers generally suffer from several inherent problems (a) relatively weak mechanical strength, (b) low dissolved oxygen permeability or a combination of both. Most lenses are made by either of two procedures, one requiring costly lathing and polishing steps and the other using delicate spin casting techniques where polymerization, crosslinking, and shaping are done simultaneously.

Perfluoropolyalkylether segments have been proposed as constituents of contact lens materials. For example:

In U.S. Pat. Nos. 3,940,207 and 3,944,347 poly(perfluoropropylene oxide) oils were incorporated into a contact lens matrix. However, in this case the material is extremely hydrophobic and the oil can leach out.

In U.S. Pat. No. 3,542,461 a terpolymer is formed from hexafluoroacetone, tetrafluoroethylene and ethylene. The polymers so formed are in general of insufficient wettability and some are not of complete clarity.

In U.S. Pat. No. 4,440,918 and Eur. Pat. Appl. EP0084406, it is disclosed to make ophthalmic devices such as contact lenses from telechelic perfluorinated polyether polymers. These polymers are extremely hydrophobic and require the addition of a hydrophilic comonomer or surface treatment to improve wettability. Although an increase in wettability is described, the increase is generally insufficient to overcome the hydrophobic nature of the perfluoropolyether segments and to provide adequate patient comfort. Also, surface treatments are generally not permanent.

In Japanese Patent Applications 61-111308, 61-112047, 61-123609, 61-126052, 61-285425 and 61-285426, are described perfluoroalkylether containing polymers useful as raw materials for oxygen permeable devices and medical devices such as contact lenses. These polymers are of poor wettability and require the addition of hydrophilic comonomers or surface treatments to obtain the requisite wettability. Also, some of these materials have a tendency of being yellow in color.

In Eur. Pat. Appl. EP0253515 is described the use of a perfluoropolyether monomer for use in soft contact lenses. These materials are also extremely hydrophobic and need a substantial quantity of hydrophilic comonomer to obtain wettability and in addition require the inclusion of the N-vinylpyrrolidone comonomer to obtain clarity.

Perfluoropolyether monomers useful in condensation polymerizations are disclosed in Eur. Pat. Appl. EP0084406 and Jap. Pat. Appl. 61-166834. In the Japanese application a perfluoropolyether polytriazine material derived from a multivalent nitrile polymer is used in gas permeating materials such as contact lenses. These materials appear yellow in color. The perfluoropolyether monomers of both patent applications are hydrophobic and require the presence of a hydrophilic comonomer. In addition, condensation polymers are generally of poor quality for contact lens use because, for example, of the difficulty in obtaining a sufficiently high molecular weight with the concomitant desirable physical properties.

In Eur. Pat. Appl. EP0273449 is described aqueous dispersions of fluorinated polyurethanes containing ionic groups and their use for textile coatings.

It is an object of the present invention to overcome the disadvantages of the prior art by providing a modified perfluoropolyalkylether macromer which is inherently hydrophilic. This is accomplished by use of a block structure where the perfluoropolyalkylether block provides a substantial portion of the oxygen permeability properties and the polyalkylether block provides the hydrophilicity.

It is a further object to provide a perfluoropolyalkylether/polyalkylether macromer which can be crosslinked in the absence of another vinylic comonomer to form a soft water-swellable hydrogel contact lens having (a) high oxygen permeability (b) good wettability (c) high mechanical strength (d) flexibility (e) optical clarity, (f) biocompatibility and (g) capable of being sterilized in boiling water. It is a further object of the present invention to provide medium to high water content contact lenses obviating, or substantially reducing, the drawbacks of the prior art.

It is a further object of the present invention to provide a method of preparing such contact lenses by crosslinking a vinylic perfluoropolyalkylether/polyalkylether monomer in a solvent in a mold, such as a spin cast mold or a static cast mold, and equilibrating the resulting solvent swollen crosslinked contact lens in an aqueous medium.

A further object of the invention is to provide a method of correcting visual defects in the form of refractive errors by fitting to the patient's eye in need of the same, a corrective contact lens of such polymer.

These and other objects of the invention are apparent from the following detailed description of the invention.

DETAILED DESCRIPTION OF THE INVENTION

The instant invention provides a macromer containing perfluoropolyalkylether and polyalkylether segments and ethylenically unsaturated moieties, having the formula I, more specifically as seen in formulas Ia to Id, $$E-T-L-Q-X-Z-X-Q-L-T-E, \quad (Ia)$$

$$E-T-L-Q-X-Z-X-Q-L, \quad (Ib)$$

$$E-T-L-Q-X-G-X-Q-L-T-E, \text{ or} \quad (Ic)$$

$$E-T-L-Q-X-G-X-Q-L \quad (Id)$$

wherein

Z is $-(C_aF_{2a}O)_b-CF_2-$, where
a is 1 to 4, b is 2 to 200;

X is a direct bond, $-CH_2-$, $-CH_2OCH_2CHOHCH_2-$, $-CH_2(OCH_2CH_2)_y-$ or carbonyl where y is 1 to 10 and where in each case the carbon atom is attached to Z or G;

Q is a direct bond or $-ACONH-R-NHCO-$ where A is oxa or imino and R is a divalent aliphatic group having from 2 to 14 carbon atoms, a divalent 5- or 6-membered cycloaliphatic group having 5 to 14 carbon atoms or an arylene group having 6 to 14 carbon atoms., L is $-A(C_mH_{2m}O)_nC_mH_{2m}AY-$ or $L_1$ where Y is a direct bond or H and m is 2 to 4 or mixtures thereof and n is 5 to 100, where A is attached to Q;

T is $-CONH-R_5A-$ or $-CONH-R-NHCOOR_5A-$ or $-CONH-R-NHCO-A-$ or $-R_5A-$ or direct bond where the carbonyl group is attached to L, where $R_5$ is alkylene or hydroxy-substituted alkylene of 2 to 15 carbon atoms and R is as above;

E is $-CO-\underset{\underset{R_1}{|}}{C}=CHR_2$ or $-CONH\text{-phenyl-}\underset{\underset{R_1}{|}}{C}=CR_2H$ or $-CONH-C(R_4)_2\text{-phenyl-}\underset{\underset{\underset{R_1}{|}\ \underset{R_2}{|}}{}}{C}=CH$ where
$R_1$ is hydrogen or methyl, and
$R_2$ is hydrogen methyl or $-COOR_3$
where
$R_3$ is hydrogen or alkyl of 1 to 4 carbon atoms with the proviso that,
when
$R_1$ is methyl, $R_2$ is hydrogen, $R_4$ is hydrogen or methyl and G is $-(C_aF_{si}O)_b-CF_2[CH_2-OCONH-R-NHCOOCH_2CF_2(OC_aF_{si})_b]_x$ or
$-(C_aF_{si}O)_b-CH_2[CH_2-NHCONH-R-NHCONHCH_2CF_2(OC_aF_{2a})_b]_x$ where x is 1 to 3;

$L_1$ is $-A(C_mH_{2m}O)_n[C_mH_{2m}ACONH-R-NHCOA(C_mH_{2m}O)_n]_zC_mH_{2m}AY$ where $n_1$ is 5 to 100, z is 1 to 10 and Y is a direct bond or H.

Preferably the macromer is of formula Ia.

In the foregoing perfluoropolyether portion, Z, of the macromonomer, a is preferably 1 or 2, and b is preferably 3 to 50.

X is preferably $-CH_2-$ or $-CH_2(OCH_2CH_2)_y-$ where y is 1 or 2.

A is preferably oxa.

Q is preferably $-OCONH-R-NHCO-$ where R is a radical derived from diisocyanates including hexane-1,6-diisocyanate, trimethyl-hexane-1,6-diisocyanate, tetramethylene-diisocyanate, phenylene-1,4-diisocyanate, toluene-2,4-diisocyanate, toluene-2,6-diisocyanate, m- and p-tetramethylxylene-diisocyanate, isophorone-diisocyanate and cyclohexane-1,4-diisocyanate, and most preferably isophorone-diisocyanate.

L is preferably a polyalkylether, $-O(C_mH_{2m}O)_nC_mH_{2m}O-$ where m is 2 or a mixture of 2 and 3, more preferably m=2 and n is 10-50. Where m is a mixture of 2 and 3, the mixture contains a major proportion of m=2.

T is preferably $-CONH-R_5A-$ where $R_5$ is preferably ethylene. Where T is $-CONH-R-NHCOOR_5A-$, R is preferably a radical derived from isophorone diisocyanate and $R_5$ is preferably ethylene.

E is preferably $$-CO-\underset{\underset{R_1}{|}}{C}=CHR_2$$

where $R_1$ is preferably methyl and $R_2$ is preferably hydroen. Where E is $$-CONH\text{-phenyl-}\underset{\underset{R_1}{|}}{C}=CHR_2,$$

$R_1$ and $R_2$ are preferably hydroen.
Where E is $$-CONH-C(R_4)_2\text{-phenyl-}\underset{\underset{\underset{R_1}{|}\ \underset{R_2}{|}}{}}{C}=CH,$$

$R_1$ is preferably methyl and $R_2$ is hydrogen.

Where G is present, x is preferably 1, and R is preferably a radical derived from isophorone diisocyanate.

Where $L_1$ is present, A is preferably oxa, R is preferably a radical derived from isophorone diisocyanate, z is preferably 1 to 5 and preferably $n=n_1$.

The vinylic macromonomers of formula I can be prepared by methods known, per se.

For example, the perfluoropolyalkylether/polyalkylether containing divinylic macromonomers of formula Ia can be prepared in a three-step sequential synthesis. In the first step, a perfluoropolyalkylether dialkanol of the formula $HOCH_2-(C_aF_aO)_b-(CF_2)-CH_2OH$ is reacted with two moles of a difunctional reactive diisocyanate of the formula $OCN-R-NCO$ in the presence of a urethane catalyst to form the corresponding reactive group containing endcapped derivative, $Z_1-(NCO)_2$, where $Z_1$ is a moiety containing a perfluoropolyalkylether segment. In the second step, the resulting endcapped perfluoropolyalkylether derivative $Z_1-(NCO)_2$ can then be reacted with two moles of a polyoxyalkylene diol of the formula $HO-(C_mH_{2m}O)_nH$ preferably in the presence of a conventioanl aprotic solvent at a temperature between about $-10°$ C. to about $100°$ C., to form the corresponding polyalkylether-perfluoropolyalkylether-polyalkylether derivative of the formula

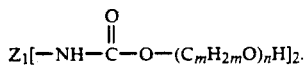

$$Z_1[-NH-C(=O)-O-(C_mH_{2m}O)_nH]_2.$$

In the third step, this triblock diol can be then reacted with two moles of reactive group containing vinylic monomer, wherein the reactive group is an isocyanate, say, of the formula

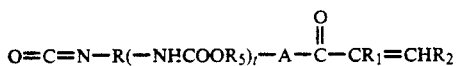

$$O=C=N-R(-NHCOOR_5)_t-A-C(=O)-CR_1=CHR_2$$

wherein R, A, $R_1$, and $R_2$ are as above defined and $t=0$ or 1, at a temperature between about $-10°$ C. to about 100° C. in the presence of a conventional aprotic solvent, in the further presence or absence of a catalytic amount of urethane catalyst. Materials comprising polymers of the formulas Ib and Id are formed by partial (or incomplete) capping in a reaction step. These materials are useful where post-polymerization modifications are performed such as tinting with reactive dyes.

Suitable aprotic solvents for conducting the reactions include formamide, N,N-dimethylformamide. phosphoric acid tri-dimethylamide, N-methyl-2-pyrrolidone, N,N-dimethylacetamide, acetamide, acetonitrile, acetone, tert-butyl acetate and preferably isopropyl acetate.

Suitable urethane catalysts include tertiary amines such as trimethylamine, triethylamine, N,N-dimethylbenzylamine, or an organo-metallic urethane catalyst, such as stannous octoate or dibutyltin dilaurate, or sodium acetate.

Alternatively the difunctional reactive agent can be an activated carboxy, such as anhydride, an acid halide, a carboxy ester or oxirane, or is a leaving group such as halide sulfato or the like. It is clear that reactants in the various steps of the synthesis be coreactive, e.g. if the perfluoropolyalkylether is terminated with an amine group, the reactive agent can contain an isocyanate, ester, acid halide, halide and the like. These coupling reactions are well known in the art.

The perfluoropolyalkylether starting materials are known and some are commercially available. They are described in U.S. Pat. Nos. 3,810,874, 3,810,875, 3,847,978, 4,085,137, 4,094,911, 4,089,319 and and 4,440,918 and European Patent Applications EP 0084406 and EP 0211237 and Japanese Patent Applications cited in the BACKGROUND OF THE INVENTION. Perfluoropolyalkylether dimethanols can be prepared by photooxidation of tetrafluoroethylene followed by cleavage and reduction reactions. Some of these are available from Ausimont, USA and are known as Fomblin ZDOL derivatives such as Fomblin ZDOL 2000, Fomblin ZDEAL 2000 and Fomblin Z—DISOC with the respectives formulas being $Z(-CH_2OH)_2$, $Z(-COOCH_3)_2$, $Z(-CONH-C_6H_3(CH_3)NCO)]_2$ where $Z=CF_2O(C_2F_4O)_4-(CF_2O)_5-CF_2(r/s\sim0.7)$. One can also chain extend these materials, for example the diols with diisocyanates, before use.

Difunctional (or multifunctional) reactive materials such as diisocyanate, diester, diepoxides and so on are known and many are commercially available.

The polyalkylether starting materials are also well known and many are commercially available (e.g. from Aldrich, Olin and, Polysciences). Hydroxy terminated polyethylene glycols, average molecular weights 200–10,000 are available from Aldrich Chemical Company, Inc. USA. Amine-terminated polyethylene glycols are known and some are commercially available, for example, Jeffamine D-400 (Jefferson Chemical and Texaco).

It is also possible to use polyalkylether copolymers such as ethylene/propylene oxide polymeric diols where the more hydrophilic ethylene oxide is in major proportion. Many polymeric copolymeric diols are known and are described in U.S. Pat. No. 4,780,488. These copolymers include poloxamers which are sold under the trade name Pluronic (BASF Wyandotte). One can also chain-extend the diols with, for example, diisocyanates before use.

In the third step of the reaction, the reactive vinylic group is introduced. Isocyanate terminated vinylic monomers are known and some are described in U.S. Pat. No. 4,665,123. Some are commercially available such as isocyanatoethyl methacrylate (Dow Corning, USA) and m-isopropenyl-2,2-dimethylbenzyl-isocyanate (m-TMI, Cyanamid). Epoxy terminated vinylic monomers, e.g. glycidyl methacrylate, are known and are commercially available.

The derivatives of formula I are advantageously polymerized in the presence of an inert diluent or solvent, such as a suitable organic solvent, including a lower alkanol, e.g. ethanol, methanol or the like, or an aprotic solvent such as N,N-dimethylformamide, acetamide, acetonitrile, N,N-dimethylacetamide, dimethyl sulfoxide, acetone, tert-butyl acetate, isopropyl acetate or mixture thereof. Also, aqueous/organic solvent systems may be employed.

The derivatives of formula I are polymerized in the presence of actinic radiation or in the presence of a conventional free radical initiator, such as a peroxide, e.g. di-tert-butyl peroxide, benzoyl peroxide, lauryl peroxide, decanoyl peroxide, acetyl Peroxide, succinic acid peroxide, methyl ethyl ketone peroxide, 2,4-dichlorobenzoyl peroxide, isopropyl peroctoate, tert-butyl hydroperoxide, tert-butyl perpivalate, tert-butyl peroctoate, diisopropyl peroxydicarbonate, cumene hydroperoxide, tert-butyl perbenzoate, tert-butyl peroxymaleic acid, tert-butyl peroxyacetate, and potassium persulfate, an azo compound, e.g. 2,2-azo-bis-isobutyronitrile, 2,2'-azo-bis-(2,4-dimethylvaleronitrile), 1,1'-azo-bis-(cyclohexane carbonitrile;, 2,2'-azo-bis(2,4-dimethyl-4-methoxyvaleronitrile) and phenyl-azo-isobutyronirile, a photoinitiator, e.g. benzoin methyl ether and 1-hydroxycyclohexylphenyl ketone or actinic radiation such as UV light or ionizing rays e.g. gamma rays or x-rays.

The derivatives of formula I are advantageously polymerized upon placement into a mold. The mold may be a conventional spin-casting mold for preparing contact lenses such as described in U.S. Pat. No. 3,408,429, or in a static mold, e.g as described in U.S. Pat. No. 4,347,198. Alternately, one may Prepare a swollen lens blank, dry the lens blank to form the corresponding xerogel, shape the xerogel into a contact lens precurser by lathing methods known to the art, and swell the shaped xerogel in aqueous medium to form the corresponding contact lens, as described in Reissue U.S. Pat. No. 27,401.

The solution of derivatives of formula I are advantageously placed into a mold in the shape of a contact lens and polymerized. After polymerization, the crosslinked polymer is equilibrated in aqueous or aqueous saline solution Optimally this post treatment further includes a heat treatment of the molded lens shaped polymer. Such heat treatment is characteristically conducted at a temperature between about 60° to 100° C., e.g. in the presence of an aqueous medium. The treatment can vary greatly, but usually is accomplished in about 5 to 90 minutes. The purpose of this post treatment is to dimensionally stabilize the crosslinked contact lens material. Also, the treatment may further serve to sterilize such lens material.

The resultant contact lenses are optically clear, strong, flexible, highly oxygen permeable and wettable. Further, the instant lenses are characterized by their ease of manufacture.

In the following examples, all parts are by weight unless otherwise described.

A description of testing methods used on the polymer films is as follows: a) Oxygen permeability (DK) is determined from measurements on a Schema Versatae or Createch polarographic cell. b) Wettability or lubricity is evaluated by a feel comparison to crosslinked polyHEMA (i.e. polymerized 2-hydroxyethyl methacrylate +1% ethylene glycol dimethacrylate). The surface lubricity of polyHEMA is designated (B); more wettable than polyHEMA is designated (A) and a less wettable surface than polyHEMA is designated (C). c) Tensile strength is qualitatively evaluated by pulling on a sheet of the material by hand and then comparing the result to a material previously evaluated by a micromechanical tester to be 14 kg/cm$^2$. A measurement found to be similar to the "standard" is designated (2); a higher value is designated (1); a lower value is designated (3); while a much lower value is designated (4).

EXAMPLE 1

This example illustrates the sequential synthesis of the perfluoropolyether/polyether urethane-linked adduct, $Z_1$-(-IPDI—PEG—IEM$)_2$, where $Z_1$ is a perfluoropolyether. IPDI is isophorone diisocyanate, PEG is a polyethylene glycol and IEM is isocyanatoethyl methacrylate; and, the solution polymerization of this adduct.

Synthesis of $Z_1$-(-IPDI—PEG$)_2$ Diadduct 30.06 g (0.0136 mole) Fomblin ZDOL 2000 (MW 2200, Montedison, Ausimont) is combined with 6.07 g (0.02734 mole) IPDI and 10 μL dibutyltin dilaurate, mixed well and stirred overnight at room temperature forming $Z_1$-(-IPDI$)_2$. The percentage of isocyanate reacted (generally 48-54%) is determined by dibutylamine titration and varies with the precise value of the $Z_1$ molecular weight actually used. Then, the calculated molar amount of PEG is added to a solution (solvent. 30–70%) of $Z_1$-(-IPDI$)_2$ to form $Z_1$-(-IPDI—PEG$)_2$. Then a urethane catalyst, i.e. dibutyltin dilaurate (0.66 mL per gram of solute) is added and the solution allowed to react at 50° C. with stirring overnight (complete disappearance of isocyanate IR absorpotion at 2270 cm$^{-1}$).

Synthesis of $Z_1$-(-IPDI—PEG—IEM$)_2$ Diadduct

The calculated molar amount of IEM is added, with rapid stirring, to a solution of $Z_1$-(-IPDI—PEG$)_2$ and reacted at 40°-50° C. (see Example 2 samples 1-3) or at room temperature (see Example 2 sample 5 and 6).

Polymerization of Diadduct: Hydrogel Formation

The $Z_1$-(-IPDI—PEG—IEM$)_2$ adduct in solvent is mixed with initiator (benzoin methyl ether, BME), poured into flat "sandwich" molds and polymerized with UV light (Sylvania, Blacklight Blue, 15 W) at room temperature for 3 hours. The polymerized films are removed from the molds, extracted in water several times, heated in boiling water for 10 minutes and then allowed to equilibrate in room temperature water (generally overnight).

EXAMPLE 2

This example shows the resultant water content and oxygen permeability values of perfluoropolyalkylether/PEG hydrogels, i.e. crosslinked $Z_1$-(-IPDI—PEG—IEM$)_2$, solution polymerized using different molecular weights of PEG (400, 600) in various amounts of solvent (acetone).

| | Wt. % In the Polymerization Mixture | | | | | | | | |
|---|---|---|---|---|---|---|---|---|---|
| Sample | $Z_1$ | IPDI | PEG | (MW) | IEM | Acetone | Wt. % BME | % H$_2$O Content | DK (barrer) |
| 1 | 39.2 | 7.9 | 14.3 | (400) | 5.5 | 33.0 | 0.1 | 14.5 | 67.0 |
| 2 | 20.3 | 4.1 | 7.4 | (400) | 2.9 | 65.3 | 0.2 | 28.9 | 68.4 |
| 3 | 34.7 | 7.1 | 19.0 | (600) | 4.9 | 34.3 | 0.04 | 29.2 | 46.2 |
| 4 | 31.6 | 6.4 | 17.4 | ↓ | 4.5 | 40.1 | 0.3 | 37.3 | 51.6 |
| 5 | 26.0 | 5.3 | 14.3 | ↓ | 3.7 | 50.8 | 0.3 | 36.9 | 53.0 |
| 6 | 16.1 | 3.3 | 8.9 | ↓ | 2.3 | 69.5 | 0.4 | 49.2 | 51.5 |

As shown above, water content increases with higher molecular weight PEG and reaction solvent content. The oxygen permeability, however, decreases with the higher molecular weight PEG.

EXAMPLE 3

This example illustrates a range of $Z_1$/PEG hydrogen water contents obtained by varying the molecular weight of the PEG and the proportion of solvent IPAC (isopropyl acetate). Films are made as in Example 1 except that the molecular weight of the PEG is 600, 900, 1000 or 1500 and the solvent used is isopropyl acetate. IEM is reacted at 40°-50° C. for all samples.

| | Wt. % In the Polymerization Mixture | | | | | | | |
|---|---|---|---|---|---|---|---|---|
| Sample | $Z_1$ | IPDI | PEG | (MW) | IEM | IPAC | Wt. % BME | % H$_2$O Content |
| 1 | 35.3 | 7.2 | 19.3 | (600) | 5.0 | 33.2 | 0.06 | 21.9 |
| 2 | 27.1 | 5.5 | 14.8 | ↓ | 3.8 | 48.8 | 0.06 | 31.2 |
| 3 | 20.8 | 4.2 | 11.3 | ↓ | 2.9 | 60.8 | 0.04 | 45.8 |
| 4 | 29.4 | 5.9 | 24.0 | (900) | 4.1 | 36.6 | 0.05 | 39.5 |
| 5 | 25.2 | 5.1 | 20.6 | ↓ | 3.6 | 45.7 | 0.04 | 40.7 |
| 6 | 20.9 | 4.2 | 17.1 | ↓ | 3.0 | 54.8 | 0.05 | 42.8 |
| 7 | 27.3 | 5.5 | 24.9 | (1000) | 3.9 | 38.4 | 0.05 | 42.9 |
| 8 | 23.8 | 4.8 | 21.7 | ↓ | 3.4 | 46.3 | 0.05 | 45.1 |
| 9 | 22.0 | 4.4 | 20.0 | ↓ | 3.3 | 47.7 | 0.05 | 45.0 |
| 10 | 20.2 | 4.1 | 18.3 | ↓ | 2.8 | 54.6 | 0.03 | 48.1 |
| 11 | 15.9 | 3.2 | 14.5 | ↓ | 2.2 | 64.2 | 0.05 | 54.2 |
| 12 | 13.9 | 2.8 | 12.6 | ↓ | 2.0 | 68.7 | 0.04 | 52.9 |
| 13 | 18.9 | 3.9 | 25.9 | (1500) | 2.7 | 48.6 | 0.05 | 57.9 |
| 14 | 16.5 | 3.4 | 22.6 | ↓ | 2.3 | 55.2 | 0.06 | 61.1 |

-continued

| | Wt. % In the Polymerization Mixture | | | | | | |
|---|---|---|---|---|---|---|---|
| Sample | $Z_1$ | IPDI | PEG (MW) | IEM | IPAC | Wt. % BME | % $H_2O$ Content |
| 15 | 14.7 | 3.1 | 20.1 | | 2.1 | 60.1 | 0.07 | 61.5 |

As shown above water content increases with increasing molecular weight PEG and solvent content.

EXAMPLE 4

This example shows the effect of hydrophilic comonomer addition on the physical properties of $Z_1$/PEG hydrogel films. Films are made as in Example 3 except that comonomer N,N-dimethylacrylamide, DMA; N-vinylpyrrolidone, NVP; or 2-hydroxyethyl methacrylate, HEMA) is added just prior to the addition of initiator.

dilaurate (DBTL) catalyst under nitrogen, mixed well and stirred overnight at room temperature. The percentage of isocyanate reacted is determined by titration to be 48–53%. PEG 1000 is reacted with $Z_1$-(IPDI)$_2$ in the presence of solvent (approximately 38% by weight isopropyl acetate, IPAC). Then 0.66 µL DBTL is added per gram solute and the solution reacted at 50° C. with stirring overnight under nitrogen. The solution is cooled to room temperature and initiator (BME) added. The solution is centrifuged five minutes (Eppendorf 5412) poured into "sandwich" molds and UV irradiated at room temperature for three hours. After water extraction, strength and wettability testing is performed.

| | Wt. % In the Polymerization Mixture | | | | | | Physical Properties of Hydrogel | | | |
|---|---|---|---|---|---|---|---|---|---|---|
| Sample | $Z_1$ | IPDI | PEG | IEM | IPAC | % BME | % $H_2O$ Content | Clarity | Wettability | Strength |
| 1 | 24.8 | 5.9 | 26.8 | 4.2 | 38.4 | 0.05 | 36.7 | Clear | B | 2 |
| 2 | 24.6 | 5.9 | 26.7 | 4.2 | 38.7 | 0.05 | 47.9 | ↓ | A | 4 |
| 3 | 25.9 | 5.8 | 25.9 | 4.0 | 38.4 | 0.1 | 46.3 | ↓ | B | 2 |
| 4 | 24.8 | 6.0 | 26.8 | 4.1 | 38.3 | 0.1 | 47.5 | ↓ | A | 3 |
| 5 | 24.7 | 6.0 | 26.8 | 4.2 | 38.4 | 0.1 | 50.4 | ↓ | A | 3 |
| 6 | 25.9 | 5.8 | 25.9 | 4.0 | 38.4 | 0.2 | 48.4 | ↓ | B | 2 |
| 7 | 24.8 | 6.0 | 26.8 | 4.1 | 38.3 | 0.2 | 51.3 | ↓ | A | 3 |
| 8 | 25.9 | 5.8 | 25.9 | 4.0 | 38.4 | 0.5 | 48.8 | ↓ | A | 2 |

As shown above, increasing initiator level from 0.05 to 0.1% and higher appears to improve property reproducibility especially water content and strength; but no added strength is found by further increasing initiator level to 0.5%.

EXAMPLE 6

| | Wt. % In the Polymerization Mixture | | | | | | | % BME | Physical Properties of Hydrogel | | | |
|---|---|---|---|---|---|---|---|---|---|---|---|---|
| Sample | $Z_1$ | IPDI | PEG | (MW) | IEM | Comonomer | IPAC | | % $H_2O$ Content | Clarity | Wettability | Strength |
| 1 | 24.4 | 4.9 | 19.9 | (900) | 3.4 | 17.1 DMA | 30.3 | 0.05 | 54.4 | Clear | A | 3 |
| 2 | 24.5 | 4.9 | 20.0 | ↓ | 3.5 | 16.7 NVP | 30.4 | 0.05 | 48.8 | ↓ | ↓ | 3 |
| 3 | 24.5 | 4.9 | 20.0 | ↓ | 3.5 | 16.6 HEMA | 30.5 | 0.05 | 37.1 | ↓ | ↓ | 2 |
| 4 | 29.4 | 5.9 | 24.0 | ↓ | 4.1 | — | 36.6 | 0.05 | 39.5 | ↓ | ↓ | 2 |
| 5 | 24.8 | 5.0 | 22.6 | (1000) | 3.5 | 9.1 DMA | 35.0 | 0.05 | 52.6 | ↓ | ↓ | 3 |
| 6 | 22.8 | 4.6 | 20.7 | ↓ | 3.2 | 16.6 | 32.1 | 0.05 | 57.1 | ↓ | ↓ | 1 |
| 7 | 21.0 | 4.3 | 19.1 | ↓ | 3.0 | 9.5 | 43.1 | 0.06 | 54.4 | ↓ | ↓ | 1 |
| 8 | 19.2 | 3.9 | 17.5 | ↓ | 2.7 | 17.4 | 39.4 | 0.05 | 60.1 | ↓ | ↓ | 3–4 |
| 9 | 24.8 | 5.0 | 22.6 | ↓ | 3.5 | 9.2 NVP | 34.9 | 0.05 | 48.6 | ↓ | ↓ | 3 |
| 10 | 22.7 | 4.6 | 20.7 | ↓ | 3.2 | 16.8 | 32.0 | 0.05 | 54.7 | Hazy | ↓ | 4 |
| 11 | 21.1 | 4.3 | 19.2 | ↓ | 3.0 | 9.0 | 43.4 | 0.04 | 49.7 | Clear | ↓ | 3 |
| 12 | 19.2 | 3.9 | 17.4 | ↓ | 2.7 | 17.5 | 39.3 | 0.05 | 52.3 | ↓ | ↓ | 4 |
| 13 | 24.8 | 5.0 | 22.6 | ↓ | 3.5 | 9.1 HEMA | 35.0 | 0.05 | 42.7 | ↓ | ↓ | 3 |
| 14 | 22.8 | 4.6 | 20.7 | ↓ | 3.2 | 16.6 | 32.1 | 0.05 | 40.0 | ↓ | ↓ | 1 |
| 15 | 21.0 | 4.2 | 19.0 | ↓ | 3.0 | 9.8 | 43.0 | 0.05 | 44.9 | Sl. Hazy | ↓ | 1 |
| 16 | 19.2 | 3.9 | 17.5 | ↓ | 2.7 | 17.4 | 39.4 | 0.05 | 44.8 | Sl. Hazy | ↓ | 1 |
| 17 | 27.3 | 5.5 | 24.9 | ↓ | 3.9 | — | 38.4 | 0.05 | 42.9 | Clear | ↓ | 1 |
| 18 | 15.7 | 3.3 | 21.5 | (1500) | 2.2 | 16.8 DMA | 40.5 | 0.05 | 69.6 | ↓ | ↓ | 2 |
| 19 | 15.7 | 3.3 | 21.5 | ↓ | 2.2 | 16.8 NVP | 40.5 | 0.05 | 63.2 | ↓ | ↓ | 3–4 |
| 20 | 15.4 | 3.2 | 21.5 | ↓ | 2.2 | 18.9 HEMA | 39.8 | 0.06 | 55.8 | Hazy | ↓ | 2 |
| 21 | 18.9 | 3.9 | 25.9 | ↓ | 2.7 | — | 48.6 | 0.05 | 57.9 | Clear | ↓ | 3 |

DMA = dimethylacrylamide
NVP = N-vinylpyrrolidone
HEMA = 2-hydroxyethyl methacrylate As shown above, addition of hydrophilic comonomers has little effect on wettability or tensile strength.

EXAMPLE 5

This example compares the effect of initiator level on the physical properties of similar composition $Z_1$/PEG hydrogel films. The films are prepared in a similar manner to that in Example 1.

In general, 3.00 9 (0.0016 mole) Fomblin ZDOL 2000, MW 1851 (previously bubbled with nitrogen for 2 hours while stored over molecular sieves) is combined with 0.72 g (0.0032 mole) IPDI and 2.5 µL dibutyltin This example illustrates the effect of various crosslinking agents on the physical properties of perfluoropolyether/PEG hydrogel films. The crosslinkers used are: a dimethacrylate of PEG 600, a dimethacrylate of ZDOL 1000 and ethylene glycol dimethacrylate.

The dimethacrylate of PEG 600 is synthesized by combining 2.425 g (0.004 mole) PEG 600 with 1.2578 g (0.008 mole) IEM, mixing well and adding 2 µL DBTL and stirring overnight at room temperature. Reaction completion is indicated by disappearance of isocyanate IR absorption at 2270 cm$^{-1}$.

The dimethacrylate of ZDOL 1000, $Z_1$-(IEM)$_2$, is synthesized by combining 1.1115 g (0.00085 mole) Fomblin ZDOL 1000 (MW 1301) with 0.2652 g (0.0017 mole) IEM, mixing well and then adding 2 μL DBTL and stirring for three hours at room temperature. Disappearance of the isocyanate IR absorption is used to monitor reaction completion. Ethylene glycol dimethacrylate (EGDMA) is distilled from a commercial source (Sartomer) before use.

EXAMPLE 8

This example shows the effect of a lower molecular weight (i.e. approximately 1000 as opposed to approximately 2000) perfluoropolyether on the properties of a $Z_1$/PEG hydrogel. The synthesis of these $Z_1$-(IPDI—PEG—IEM)$_2$ diadducts is similar to that described in Example 3. More specifically, 5.0082 g (0.0038 mole) Fomblin ZDOL 1000 (MW 1301) is reacted with 1.7121 g (0.0077 mole) IPDI in solvent (20% isopropyl acetate) while stirring at room temperature overnight in the

| | Wt. % In the Polymerization Mixture | | | | | | | Physical Properties of Hydrogel | | | |
|---|---|---|---|---|---|---|---|---|---|---|---|
| Sample | $Z_1$ | IPDI | PEG 1000 | IEM | IPAC | Comonomer | % BME | % H$_2$O Content | Clarity | Wetta- bility | Strength |
| 1 | 22.4 | 5.4 | 24.3 | 3.8 | 34.8 | 9.3 PEG 600-(IEM)$_2$ | 0.1 | 49.8 | Clear | A | 3 |
| 2 | 19.9 | 4.8 | 22.4 | 3.5 | 36.2 | 13.1 ↓ | 0.1 | 48.3 | ↓ | A | 4 |
| 3 | 20.7 | 4.9 | 22.3 | 3.5 | 35.4 | 13.2 ↓ | 0.09 | 48.6 | ↓ | A | 4 |
| 4 | 24.4 | 5.9 | 26.4 | 4.1 | 38.1 | 1.1 EGDMA | 0.1 | 45.3 | ↓ | B | 3 |
| 5 | 24.5 | 5.9 | 26.4 | 4.1 | 38.1 | 1.0 ZDOL 1000(IEM)$_2$ | 0.1 | 53.6 | ↓ | A | 2-3 |
| 6 | 24.7 | 5.9 | 26.7 | 4.2 | 38.5 | ↓ | 0.1 | 46.7 | ↓ | A | 3 |

PEG 600-(IEM)$_2$ = PEG 600 dimethacrylate
EGDMA = ethylene glycol dimethacrylate
ZDOL 1000-(IEM)$_2$ = ZDOL 1000 dimethacrylate

EXAMPLE 7

This example shows the physical properties of perfluoropolyether/PEG hydrogel films made by combining the diadducts of $Z_1$-(IPDI—PEG—IEM)$_2$ which have different PEGs, but the same $Z_1$ (i.e. ZDOL 2000). The PEGs used are 400, 600 and 1000. The reaction solutions are prepared in isopropyl acetate as in Example 5 except that nitrogen degassing is not used. The solutions are mixed in various ratios just prior to initiator (BME) addition.

presence of 2 μL DBTL; some samples (i.e. sample numbers 3, 5 and 6) are reacted without solvent. The $Z_1$-(IPDI)$_2$ diadduct is then reacted with 2 moles of PEG (i.e. 200, 400, 600, 900 or 1000). The PEG is first dissolved in a certain quantity of isopropyl acetate (the weight of solvent calculated to be 40% of the final reaction mixture) at 50° C. (PEG 600, 900, 1000) or at room temperature (PEG 200, 400).

In Sample 1 for example, 0.2211 9 (0.0011 mole) PEG 200 is dissolved in 0.5692 g IPAC then 1.2098 g of the $Z_1$-(IPDI)$_2$ adduct is added, the mixture mixed well

| | Mole Ratio | Wt. % In the Polymerization Mixtures | | | | | | | Physical Properties of Hydrogel | | | |
|---|---|---|---|---|---|---|---|---|---|---|---|---|
| Sample | $Z_1$-(IPDI-PEG-IEM)$_2$ | $Z_1$ | IPDI | PEG | (MW) | IEM | IPAC | % BME | % H$_2$O Content | Clarity | Wetta- bility | Strength |
| 1 | 1 PEG 1000/1 PEG 600 | 27.1 | 6.5 | 14.8 8.7 | (1000) (600) | 4.6 | 38.3 | 0.05 | 39.0 | Clear ↓ | A ↓ | 3 ↓ |
| 2 | 3 PEG 1000/1 PEG 600 | 25.9 | 6.2 | 21.1 4.1 | (1000) (600) | 4.3 | 38.4 | 0.06 | 42.4 | ↓ ↓ | ↓ ↓ | ↓ ↓ |
| 3 | 1 PEG 1000/1 PEG 400 | 28.6 | 6.5 | 15.6 6.1 | (1000) (400) | 4.8 | 38.3 | 0.05 | 35.0 | ↓ ↓ | ↓ ↓ | ↓ ↓ |
| 4 | 3 PEG 1000/1 PEG 400 | 26.5 | 6.4 | 21.2 2.9 | (1000) (400) | 4.5 | 38.3 | 0.05 | 40.9 | ↓ ↓ | ↓ ↓ | ↓ ↓ |
| 5 | PEG 1000 | 24.7 | 5.9 | 26.7 | (1000) | 4.2 | 38.5 | 0.1 | 46.7 | ↓ | ↓ | ↓ |

The results show that though the water content of a $Z_1$-(IPDI—PEG 1000—IEM)$_2$ film is lowered slightly by the copolymerization with $Z_1$-(IPDI—PEG 400—IEM)$_2$ or $Z_1$-(IPDI—PEG 600—IEM)$_2$, the clarity, wettability and strength appear the same.

followed by the addition of 0.78 μL DBTL and stirring overnight at 50° C. The solution is then cooled to room temperature, 0.1714 g (0.0011 mole) IEM added and the mixture reacted with stirring at room temperature overnight. Addition of initiator (BME), polymerization and water equilibration are similar to that described in Example 1.

| | | | | Physical Properties of Hydrogel | | |
|---|---|---|---|---|---|---|
| Sample | MW PEG | % IPAC In The Polymerization Mixture | % BME | % H$_2$O Content | Oxygen Permeability (barrer) | Observation |
| 1 | 200 | 40 | 0.48 | 5.92 | 25.3 | very slightly hazy on edges; wettability = B |
| 2 | 400 | | 0.49 | 19.48 | 24.0 | clear; wettability = B |
| 3 | 600 | | 0.06 | 34.29 | 20.8 | clear; yellow edges; wettability = A |
| 4 | 900 | | 0.51 | 47.66 | 25.9 | clear; wettability = A |
| 5 | 1000 | | 0.07 | 50.28 | 22.9 | clear; wettability = A |

-continued

| Sample | MW PEG | % IPAC In The Polymerization Mixture | % BME | % H$_2$O Content | Physical Properties of Hydrogel Oxygen Permeability (barrer) | Observation |
|---|---|---|---|---|---|---|
| 6 | 1000 | | 0.48 | 51.50 | — | clear; wettability = A |

As shown above, water content and wettability increase with increasing molecular weight of PEG.

EXAMPLE 9

This example shows the effect of PEG molecular weight and solvent content (isopropyl acetate) on various physical properties if perfluoropolyether/polyether hydrogels obtained using Fomblin ZDOL TX 2000 ($Z_1$TX, MW 2288) a perfluoropolyether with an additional 1 or 2 ethylene oxide units adducted to the terminal hydroxyl groups of ZDOL 2000.

Films are made in a similar manner to those described in Example 3. The reaction of $Z_1$TX and two moles of IPDI is monitored by isocyanate titration and the percent isocyanate reacted is found to be approximately 50% · (47–52%). The product, $Z_1$TX–(IPDI—PEG—IEM)$_2$ is formed through the reaction of two moles of IEM with $Z_1$TX–(IPDI—PEG)$_2$ adduct in IPAC at room temperature overnight.

As shown in the table below, in general, use of the perfluoropolyether $Z_1$TX yielded strong clear films whose percent water content increases with PEG molecular weight and solvent content.

| Sample | MW PEG | % IPAC In The Polymerization Mixture | % H$_2$O Content | Physical Properties of Hydrogel Clarity/Wettability/Strength | | |
|---|---|---|---|---|---|---|
| 1 | 400 | 28 | 16 | Clear | A | 2 |
| 2 | ↓ | 39 | 17 | Clear | B | 1 |
| 3 | ↓ | 48 | 21 | Hazy | B | 2 |
| 4 | ↓ | 66 | 28 | Cloudy | B | 2 |
| 5 | 600 | 38 | 29 | Clear | A | 1 |
| 6 | ↓ | 50 | 30 | Sl. hazy | A | 2 |
| 7 | ↓ | 59 | 39 | Hazy | B | 3 |
| 8 | 900 | 29 | 39 | Clear | A | 4 |
| 9 | ↓ | 40 | 40 | Clear | ↓ | 1 |
| 10 | ↓ | 50 | 43 | Clear | ↓ | 1 |
| 11 | ↓ | 58 | 47 | Clear | ↓ | 1 |
| 12 | 1000 | 28 | 47 | Clear | ↓ | 1 |
| 13 | ↓ | 38 | 42 | Clear | ↓ | 1 |
| 14 | ↓ | 38 | 40 | Clear | ↓ | 2 |
| 15 | ↓ | 49 | 43 | Clear | ↓ | 1 |
| 16 | ↓ | 59 | 47 | Sl. hazy | ↓ | 4 |
| 17 | 1500 | 39 | 55 | Clear | ↓ | 2 |
| 18 | ↓ | 39 | 56 | Clear | ↓ | 2 |
| 19 | ↓ | 49 | 57 | Clear | ↓ | 2 |
| 20 | ↓ | 59 | 60 | Clear | ↓ | 1 |

EXAMPLE 10

This example shows the synthesis of a perfluoropolyether/polyether hydrogel in which the urethane group linking the perfluoropolyether chain and polyether chain (reaction with IPDI) is replaced by an ether linkage; this is accomplished by using an epoxy-terminated PEG.

More specifically, 2.1091 g (0.00096 mole) Fomblin ZDOL 2000 (MW 2200) is reacted at 60° C. overnight with 0.7749 g (0.00194 mole) polyethylene glycol 400 diglycidyl ether (PEGE 400, Polysciences), using 0.0167 g triethylamine catalyst. After 16 hours, the temperature of the mixture (opaque) is raised to 70° C., 0.0220 g triethylamine added and the mixture stirred overnight leading to a clear, yellow, viscous product, $Z_1$–(O—PEG 400)$_2$. Then 0.5213 g (0.00017 mole) of $Z_1$–(O—PEG 400)$_2$ is combined with 1.8890 g dimethyl sulfoxide, DMSO, (Aldrich Gold Label, 99.9%) and 0.0539 g (0.00035 mole) IEM which is added dropwise to the rapidly stirring mixture. The solution is reacted at room temperature approximately 72 hours. Then 0.0040 g BME is added and the solution poured into a "sandwich" mold and UV irradiated at room temperature for 13 hours resulting in a soft gel. This material after equilibration in water becomes a clear hydrogel film.

EXAMPLE 11

This example shows the fabrication of prototype perfluoropolyether/polyether lenses from polypropylene contact lens molds. The reaction solution is made as in Example 5 (samples 3–5) using 0.1% BME as initiator. The solution is pipetted into the lens molds and UV cured for 3 hours. After water extraction and boiling, one obtains optically clear, strong lenses. Micromechanical tensile tests performed on the lenses yield the following properties; stress of 3.6 kg/cm$^2$, Young's modulus of 26 kg/cm$^2$ and a 13% elongation.

EXAMPLE 12

This example illustrates the preparation of hydrogels obtained via polymerization of partially IEM capped $Z_1$–(IPDI—PEG 1000)$_2$ adduct ($Z_1$ Adduct). The incompletely capped adduct, i.e. mixtures of PEG—IDPI—$Z_1$—IPDI—PEG—IEM and IEM—PEG—IPDI—$Z_1$—IPDI—PEG—IEM, is prepared as in Example 1 except that 50%–90% of the amount of IEM is added to partially react the PEG 1000 hydroxyl groups. The adducts are then polymerized with or without comonomer (DMA, HEMA, NVP) into sheets (samples 1–5) or lenses (samples 6–8) using UV irradiation (3 hours, 0.05% BME initiator) and water equilibration.

| Sample | Polymerization Mixture $Z_1$:IPDI:PEG:IEM Molar Ratio | % $Z_1$ Adduct | % IPAC | % Comonomers | Physical Properties of Hydrogel % $H_2O$ Content | Clarity | Wettability |
|---|---|---|---|---|---|---|---|
| 1 | 1:2:2:1 | 61.9 | 38.1 | — | 54.7 | Clear | A |
| 2 | ↓ | 54.6 | 45.4 | — | 64.1 | Clear | A |
| 3 | ↓ | 49.6 | 41.2 | 9.2 DMA | 68.7 | Clear | A |
| 4 | ↓ | 49.6 | 41.2 | 9.2 HEMA | 55.7 | Hazy | A |
| 5 | ↓ | 49.7 | 41.2 | 9.1 NVP | 58.3 | Clear | A |
| 6 | 1:2:2:1.5 | 66.3 | 33.7 | — | 52.9 | Clear | A |
| 7 | 1:2:2:1.8 | 61.1 | 38.9 | — | 52.7 | Clear | A |
| 8 (Control) | 1:2:2:2 | 61.6 | 38.4 | — | 48.7 | Clear | A |

EXAMPLE 13

This example illustrates the preparation and physical properties of the hydrogels obtained when various amounts of the $Z_1$-(-IPDI—PEG—IEM)$_2$ diadduct ($Z_1$ Diadduct) are copolymerized with the reaction product (RP Adduct) of $Z_1$-(-IPDI—PEG)$_2$ and an equal molar amount of IEM. The $Z_1$-(-IPDI—PEG—IEM)$_2$ diadduct is prepared as in Example 1 using 37.4% IPAC as solvent. The RP Adduct is also prepared as in Example 1 with 38.1% IPAC except that 50% of the amount of IEM is added. These materials, i.e. $Z_1$ Diadduct and RP Adduct in IPAC are combined in various ratios and UV polymerized (3 hours, 0.05% BME initiator) into sheets.

| Sample | Polymerization Mixture % $Z_1$ Diadduct | % Comonomer Adduct | % IPAC | % $H_2O$ Content | Physical Properties of Hydrogel Young's Modulus (kg/cm$^2$) | Stress (kg/cm$^2$) | % Elongation |
|---|---|---|---|---|---|---|---|
| 1 | 61.0 | 1.0 $Z_1$-(-IEM)$_2$ | 38.0 | 47.6 | 21 ± 4 | 3.0 ± 0.9 | 14 ± 3 |
| 2 | 57.6 | 1.1 $Z_1$-(-IEM)$_2$ 5.5 $Z_1$/IEM | 35.8 | 44.3 | 22 ± 5 | 2.9 ± 0.4 | 13 ± 3 |
| 3 Control | 61.6 | — | 38.4 | 48.7 | 25 ± 5 | 4.0 ± 0.7 | 15 ± 2 |

| Sample | Polymerization Mixture % RP Adduct | % $Z_1$ Diadduct | Physical Properties of Hydrogel % $H_2O$ Content | Clarity | Wettability | Strength |
|---|---|---|---|---|---|---|
| 1 | 85.4 | 14.6 | 53.01 | Clear | A | 3-4 |
| 2 | 84.6 | 15.4 | 52.08 | ↓ | A | 4 |
| 3 | 50.0 | 50.0 | 44.39 | ↓ | A | 3 |
| 4 | 50.0 | 50.0 | 48.01 | ↓ | A | 3 |
| 5 | 14.8 | 85.2 | 44.16 | ↓ | A | 3 |
| 6 | 100.0 | — | 54.71 | ↓ | A | 4 |
| 7 | — | 100.0 | 44.45 | ↓ | A | 3 |

As shown above, water content tends to increase with increasing RP Adduct content.

EXAMPLE 14

This example illustrates the tensile strength of lenses polymerized from the $Z_1$-(-IPDI—PEG 1000—IEM)$_2$ diadduct ($Z_1$ Diadduct) with or without additional comonomer adducts. The $Z_1$-(-IPDI—PEG 1000—IEM)$_2$ diadduct is prepared as in Example 1. The comonomers used are prepared by reaction of 1 mole $Z_1$ with one mole IEM ($Z_1$/IEM) or two moles IEM ($Z_1$-(-IEM)$_2$) using dibutyltin dilaurate as catalyst. The diadduct in IPAC is combined with the additional comonomer adduct(s) and polymerized using UV irradiation (3 hours, 0.1% BME initiator).

What is claimed is:

1. A macromer prepared by endcapping
   (a) $HOCH_2$—$(C_aF_{2a}O)_b$—$CH_2$—$CH_2OH$
   where a is 1 to 4 and b is 2 to 200 with (b) 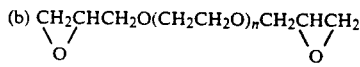

where n is 5 to 100 followed by reaction with (c) 2-isocyanatoethyl methacrylate wherein the reactants a:b:c are in a 1:2:2 molar ratio.

2. A crosslinked homopolymerization product of the macromer of claim 1.

3. An ophthalmic device prepared from the product of claim 2.

4. The ophthalmic device of claim 3 wherein said device is a contact lens.